J. M. SAILER.
CLUTCH.
APPLICATION FILED MAY 10, 1910.

985,286.

Patented Feb. 28, 1911.

Witnesses
Gertrude Tolleman
Luella G. Greenfield

Inventor
John M. Sailer
By Chappell Earl
Attorneys

THE NORRIS PETERS CO., WASHINGTON, D. C.

UNITED STATES PATENT OFFICE.

JOHN M. SAILER, OF JANESVILLE, WISCONSIN, ASSIGNOR OF ONE-HALF TO WILLIAM MUSSER, OF IOWA CITY, IOWA.

CLUTCH.

985,286.   Specification of Letters Patent.   Patented Feb. 28, 1911.

Application filed May 10, 1910. Serial No. 560,404.

*To all whom it may concern:*

Be it known that I, JOHN M. SAILER, a citizen of the United States, residing at Janesville, Wisconsin, have invented certain new and useful Improvements in Clutches, of which the following is a specification.

This invention relates to improvements in clutches.

The main objects of this invention are, first, to provide an improved friction clutch which is capable of transmitting heavy loads, and one which is at the same time very easily engaged and disengaged. Second, to provide an improved clutch in which the driving strain on the parts is minimized. Third, to provide an improved clutch which is simple in structure and operation, and very durable in use.

Further objects and objects relating to structural details will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

Figure 2:
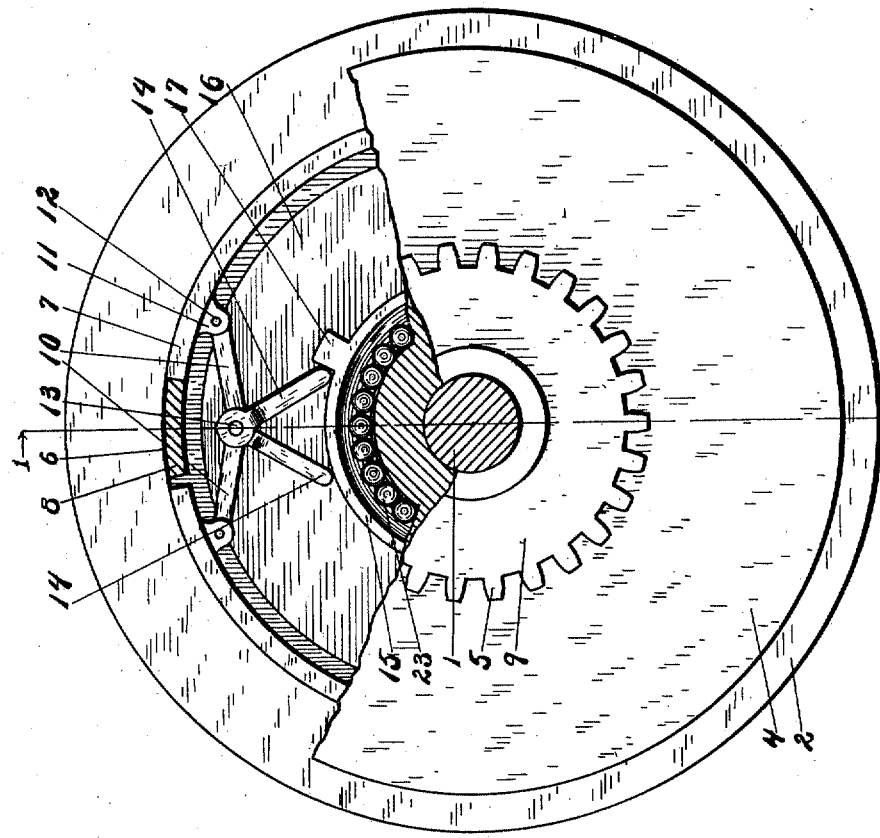
Figure 1:
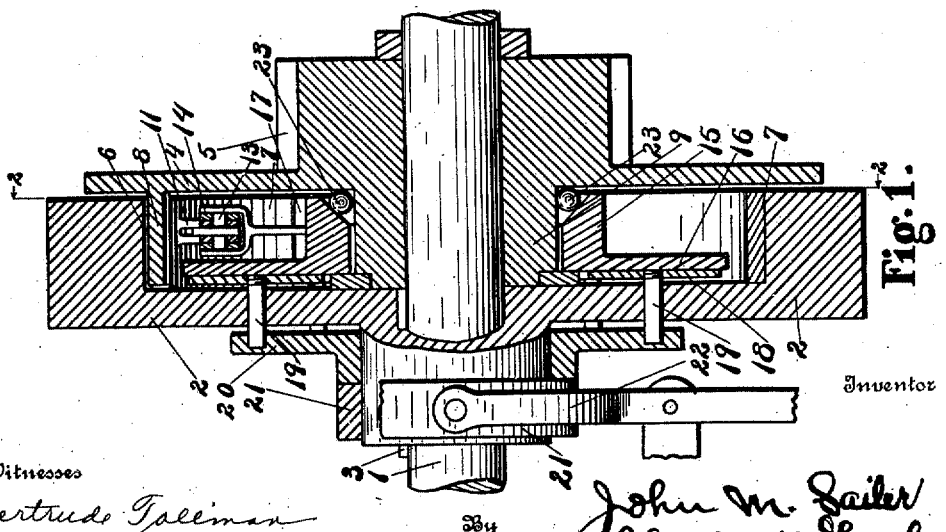

A structure constituting an effective and preferred embodiment of the features of my invention is clearly illustrated in the accompanying drawing, forming a part of this specification, in which:

Figure 1 is a vertical central section through a structure embodying the features of my invention, taken on a line corresponding to line 1—1 of Fig. 2, the driving shaft and certain other parts being shown in full lines for convenience in illustrating. Fig. 2 is a detail vertical section taken on a line corresponding to line 2—2 of Fig. 1.

In the drawings, similar numerals of reference refer to similar parts in both views, and the sectional views are taken looking in the direction of the little arrows at the ends of the section lines.

Referring to the drawing, 1 represents the driving shaft. The driving member 2, which, in the structure illustrated, is a fly wheel, is secured to this shaft to revolve therewith, as by means of a suitable feather 3. The driven member 4 is revolubly mounted on the shaft. The driven member 4, in the structure illustrated, is provided with a gear 5. The driving member 2 is chambered and provided with an annular friction surface 6. Arranged within the driven member to coact with this friction surface is a split clutch ring 7. The driven member 4 is provided with a driving lug 8 which projects between the ends of the ring 7, as clearly appears from the drawing. The driven member 4 is preferably provided with a hub 9 projecting into the driving member. The clutch ring 7 is actuated by a toggle consisting of a pair of links 10 which are connected to the ends of the clutch ring and to each other, the ring being provided with ears 11 for the pivots 12, the inner ends of the link being connected by the pivot 13. On this pivot I mount a pair of oppositely-disposed actuating levers 14. The free ends of these levers rest upon the hub 15 of the disk-like actuating member 16, which is provided with a lug 17 adapted to engage the actuating levers as the member is revolved. This member is revolubly mounted on the hub of the driven member 4 and is adapted to revolve in either direction into engagement with the levers. When revolved in one direction, the lug 17 engages one of the levers 14 and when revolved in the other direction, engages the other lever. This actuating member 16 is disengageably connected with the driving member 2, preferably by means of the friction disk 18, which is secured to the driving member to revolve therewith. This connection preferably consists of pins 19 which are slidably arranged through the driving member to project therefrom. The outer ends of these pins are engaged by the actuating plate or member 20, which is in turn acted upon by the collar 21, to which the shifting lever 22 is connected, as is shown in Fig. 1.

The member 15 is preferably provided with bearing balls 23, arranged to receive the thrust.

When it is desired to engage the clutch, the lever 22 is actuated to throw the plate 20 inwardly, or toward the driving member 2, which engages the friction members 18 and 16, thereby connecting the toggle actuating member 16 to the driving wheel. The member 16 is rotated into engagement with the toggle actuating levers 14, which engage the friction member 7 with the driving member 2 and thus connects the driven member with the driving member.

My improved clutch is advantageous in that it is capable of transmitting heavy loads and with a minimum of strain upon the parts. It may also be easily engaged and disengaged.

I have illustrated and described my improvements in detail in the form preferred by me on account of structural simplicity and economy. I am aware, however, that it may be considerably modified in structural details without departing from my invention. I have not attempted to illustrate or describe such modifications herein, as I believe they will be readily understood by those skilled in the art to which this invention relates.

Having thus described my invention, what I claim as new and desire to secure by Letters Patent is:

1. In a clutch, the combination with a driving shaft; a driving member revolving with said shaft and having an internal annular friction surface; a split friction ring arranged to coact with said friction surface; a driven member revolubly mounted on said shaft having a driving lug projecting between the ends of said friction ring; a driven disk revolubly mounted on the hub of said driven member; links pivotally connected to said friction ring and to each other; oppositely disposed levers mounted on the connecting pivot for said links, the free ends of said levers being adapted to rest on the hub of said driven disk, said hub being provided with a lever engaging lug; a driving disk coacting with said driven disk; pins on said driving disk slidably arranged through said driving member; a slidably mounted actuating member arranged to engage said pins; and means for shifting said actuating member.

2. In a clutch, the combination with a driving shaft; a driving member revolving with said shaft and having an internal annular friction surface; a split friction ring arranged to coact with said friction surface; a driven member revolubly mounted on said shaft having a driving lug projecting between the ends of said friction ring; a driven disk revolubly mounted on the hub of said driven member; links pivotally connected to said friction ring and to each other; oppositely disposed levers mounted on the connecting pivot for said links, the free ends of said levers being adapted to rest on the hub of said driven disk, said hub being provided with a lever engaging lug; and a driving disk coacting with said driven disk and said driving member.

3. In a clutch, the combination of a driven member provided with an internal annular friction surface; a split friction ring arranged to coact with said friction surface; a driven member having a driving lug projecting between the ends of said friction ring; links pivotally connected to the ends of said friction ring and to each other; oppositely disposed levers pivotally mounted on the connecting pivots of said links; a revolubly mounted driven disk adapted to engage the free ends of said levers; a driving disk slidably mounted on said driving member, arranged to coact with said driven disk; and means for actuating said driving disk.

4. In a clutch, the combination of a driven member provided with an internal annular friction surface; a split friction ring arranged to coact with said friction surface; a driven member having a driving lug projecting between the ends of said friction ring; links pivotally connected to the ends of said friction ring and to each other; oppositely disposed levers pivotally mounted on the connecting pivots of said links; a revolubly mounted member adapted to engage the free ends of said levers; and means for connecting said member with said driving member.

5. In a clutch, the combination of a driving member having an internal annular friction surface; a split friction ring arranged to coact with said friction surface; a driven member having a driving connection with said friction ring; links pivotally connected to said friction ring and to each other; oppositely disposed levers mounted on the connecting pivot for said links; a revolubly mounted actuating member for said levers, the free ends of said levers being adapted to rest on said member, said member being provided with a lever engaging lug; and a disconnectible driving connection for said driving member and said lever actuating member.

6. In a clutch, the combination with a driving member; a coacting clutch ring; a driven member having driving connections with said clutch ring; a toggle for actuating said clutch ring; a revolubly mounted driven disk for actuating said toggle, adapted to actuate the same to set the clutch ring when revolved in either direction; a driving disk coacting with said driven disk; pins on said driving disk slidably arranged through said driving member; a slidably mounted actuating member arranged to engage said pins; and means for shifting said actuating member.

7. In a clutch, the combination with a driving member; a coacting clutch ring; a driven member having driving connections with said clutch ring; a toggle for actuating said clutch ring; a revolubly mounted driven disk for actuating said toggle, adapted to actuate the same to set the clutch ring when revolved in either direction; and a driving disk coacting with said driven disk, and said driving member.

8. In a clutch, the combination with a main driving member; a coacting clutch ring; a driven member having driving connections with said clutch ring; a toggle for actuating said clutch ring; a revolubly mounted driven member for actuating said toggle, adapted to actuate the same to set the clutch ring when revolved in either direction; a driving member for said toggle actuating member, and said main driving member, all coacting as specified.

9. In a clutch, the combination with a driving member; a coacting clutch ring; a driven member having driving connections with said clutch ring; a toggle for actuating said clutch ring; a revolubly mounted actuating member for said toggle, adapted to actuate the same to set the clutch ring when revolved in either direction; and means for detachably connecting said toggle actuating member with said driving member, all coacting as specified.

10. In a clutch, the combination of a driving member having an internal annular friction surface; a friction ring arranged to coact with said friction surface; a driven member having a driving connection with said friction ring; means for actuating said friction ring comprising a revolubly mounted actuated disk; and a driving disk coacting with said actuated disk and said driving member.

In witness whereof, I have hereunto set my hand and seal in the presence of two witnesses.

JOHN M. SAILER. [L. S.]

Witnesses:
LUELLA G. GREENFIELD.
F. GERTRUDE TALLMAN.

---

Copies of this patent may be obtained for five cents each, by addressing the "Commissioner of Patents, Washington, D. C."